United States Patent Office 3,350,465
Patented Oct. 31, 1967

3,350,465
PROCESS FOR PREPARING A CYCLIC ALCOHOL
Johannes W. M. Steeman and Johan P. H. von den Hoff, Geleen, Netherlands, assignors to Stamicarbon N.V., Heerlen, Netherlands
No Drawing. Filed Dec. 17, 1962, Ser. No. 244,922
Claims priority, application Netherlands, Jan. 15, 1962, 273,572
3 Claims. (Cl. 260—631)

The present invention relates to the preparation of cyclic alcohols by oxidizing saturated cyclic hydrocarbons with boric acid.

It is known that this oxidation can be carried out in the liquid phase with molecular oxygen or gases containing molecular oxygen, e.g., air, at a temperature of 100 to 300° C. It is also known that the formation of undesired by-products, such as acids, may be at least partly counteracted by the boric acid because the acid and the alcohol produced react to form esters which resist further oxidation. This desirable activity of boric acid, which is hard to dissolve in the hydrocarbon to be oxidized, can be promoted by suspending the solid boric acid in a finely divided state in the hydrocarbon.

A major improvement in prior procedures for preparing cyclic alcohols by the above-noted reaction is described in copending U.S. application Ser. No. 244,894. In particular, said application describes and claims for use in the oxidation reaction, the suspension of boric acid in the hydrocarbon which is obtained by mixing the hydrocarbon with an aqueous solution of boric acid and then evaporating water from the mixture.

It has also been previously suggested to use the boric acid, not as a suspension, but in the form of boric acid esters which can be dissolved in the hydrocarbon. The cyclic alcohol formed in the oxidation reacts with the boric acid ester and re-esterification takes place. This requires separating the desired cyclic alcohol from the alcohol formed from the added ester.

The principal object of the present invention is to provide certain improvements in those prior procedures where a boric acid ester solution in hydrocarbon is used in lieu of a suspension of boric acid. Other objects will also be hereinafter apparent.

Briefly stated, the objects of the present invention are realized by using, as the boric acid ester, an ester containing fewer than three oxyhydrocarbon groups per boron atom. These boric acid esters are incomplete esters, which, in the course of the oxidation, react with the desired alcohol with continued esterification. These incomplete esters are more readily dissolved in the hydrocarbon than boric acid, which is almost insoluble therein, and consequently are very suitable for promoting the oxidation of the hydrocarbon into a cyclic alcohol.

The use of the incomplete boric acid esters as described herein very considerably limits, and may even completely obviate, the re-esterification reaction encountered with prior art procedures using boric acid esters. This means that there is less re-esterification alcohol which has to be separated from the desired cyclic alcohol, the oxidation is favorably promoted and the execution thereof is greatly facilitated and simplified.

As compared with the process using boric acid, the use of incomplete esters as described herein has the added advantage that less water is formed during the oxidation. As a result, less water has to be removed from the oxidation reaction medium. When compared with prior procedures using the complete boric acid triesters, the use of incomplete esters has the advantage noted above, i.e., direct esterification with the cyclic alcohol is possible so that re-esterification need not be effected or is necessary only to a limited degree.

In a preferred way of carrying out the present invention, there is used an incomplete ester of an alcohol identical to the alcohol which is being prepared. For example, a cyclohexyl ester would be used in the oxidation of cyclohexane and a cyclododecyl ester in the oxidation of cyclododecane. This completely obviates the formation of an alcohol which has to be separated from the desired cyclic alcohol.

Examples of partial or incomplete esters suitable for use herein are the metaboric acid esters, such as the methyl ester, ethyl ester, isopropyl ester, butyl ester, or, in general, the alkyl esters of metaboric acid, also aryl esters, such as the phenyl ester of metaboric acid, and the cyclic alkyl esters, such as cyclohexyl esters, cycloheptyl esters, and cyclododecyl esters of metaboric acid. The ratio between alcohol and acid, of which the ester is composed, need not be equal to the equimolecular ratio existing in the metaboric acid esters, but other alcohol/acid ratios, lower than 3:1, may be used. Very suitable esters are for instance those composed of 3 alcohol molecules and 4 boric acid molecules.

The ester to be used may, if desired, be prepared, in the presence of the hydrocarbon to be oxidized, from boric acid and an alcohol, or from boric acid and a boric acid tri-ester.

The oxidation is effected by bringing the hydrocarbon, together with the incomplete boric acid ester, into contact with molecular oxygen, e.g., pure oxygen or a gas containing molecular oxygen such as air or some other mixture of oxygen and inert gas, typically nitrogen, at a temperature of 100 to 300° C. The reaction can be conveniently carried out by simply passing the gas though hydrocarbon containing the incomplete ester. It is not necessary to use a catalyst, although if desired, catalysts, such as cobalt naphthenate and cobalt oleate, may be used.

The oxidation should be carried out with the hydrocarbon in the liquid phase. Hence, if the oxidation is effected at a temperature above the normal boiling point of the hydrocarbon, an elevated pressure should be used sufficient to maintain the hydrocarbon in liquid form.

Water formed during the oxidation can be easily removed in the vapor state during the oxidation and any hydrocarbon evaporated along with the water can be recirculated after condensation.

After the oxidation is over, the reaction product may be appropriately processed to recover the non-converted hydrocarbon. This is most simply done by distilling off the hydrocarbon. Thereafter the remainder of the reaction mixture is treated with hot water or an aqueous solution of alkali metal hydroxide or carbonate to hydrolyze or saponify the boric acid esters. This liberates the desired cyclic alcohol which can be separated from the reaction product. The hydrolysis of the esters in the oxidation reaction product may be effected in such a way, for instance with the aid of boric acid, that there is obtained an incomplete ester suitable for use in the oxidation.

The amount of incomplete ester used herein can be widely varied but should be sufficient to esterify the cyclic alcohol as it is formed. Usually from 10 to 15% excess ester, over and above that theoretically necessary to esterify the alcohol will be used.

The invention is illustrated but not limited by the following examples:

Example 1

In a reaction vessel having a capacity of 50 liters and provided with a heating jacket and a stirrer, 25 kg. of cyclohexane are mixed with 3 kg. of cyclohexanol and 1.86 kg. of boric acid. The mixture is heated to a temperature of 68 to 75° C., while the water produced during formation of the ester is evaporated from the vessel. The cyclohexane evaporated along with the water is returned to the reaction vessel after condensation and phase separation.

The temperature is then raised to 164–165° C. and a gas composed of nitrogen and oxygen (5 percent by volume of oxygen) is passed through the reaction mixture at the rate of 5 m.³ per hour (measured at 0°C. and 1 atm.), while the pressure is maintained at 9 atm. The water formed during the oxidation is removed in the vapor state, and hydrocarbon evaporated along with the water is recirculated after condensation.

After 2 hours the oxidation is stopped and the non-converted cyclohexane is separated off by distillation. 22.5 kg. of cyclohexane are recovered, corresponding to a degree of conversion of 10 percent by weight.

The raw oxidation product is washed with a dilute, aqueous sodium hydroxide solution (0.5% sodium hydroxide) at 60 to 90° C. in which treatment the esters present are hydrolyzed. After washing with water and phase separation, an oil is obtained which contains 4.97 kg. of cyclohexanol and 0.42 kg. of cyclohexanone (molar ratio 4.5:1).

The yield, calculated on the amount of converted cyclohexane and with allowance being made for the amount of cyclohexanol added, amounts to 66% of cyclohexanol and 14.5% of cyclohexanone.

*Example 2*

3.1 kg. of a boric acid cyclohexanol compound (molar ratio 4:3) containing 2.1 kg. of cyclohexanol in the form of an ester are mixed with 25 kg. of cyclohexane.

This mixture is oxidized in the manner described in Example 1 with the following results:

Recovered cyclohexane 22.8 kg.; degree of conversion 9%
Cyclohexanol 4.01 kg.; yield 73%
Cyclohexanone 0.37 kg.; yield 14%
Molar ratio cyclohexanol:cyclohexanone=about 5:1

It will be appreciated that various modifications may be made in the invention as described above. Thus, while the foregoing examples relate to the use of cyclohexane, other saturated cyclic hydrocarbons, such as cyclopentane, cycloheptane, and cyclododecane may also be used to give the corresponding cyclic alcohols. Accordingly, the scope of the invention is set forth in the following claims wherein:

It is claimed:
1. In a process for preparing a cyclic alcohol by the oxidation of a saturated cyclic hydrocarbon which comprises contacting said hydrocarbon in the liquid phase with molecular oxygen at a temperature of 100 to 300° C. in the presence of an added boric acid ester, followed by hydrolysis of the resulting oxidation product, the improvement which comprises utilizing a boric acid ester composed of boric acid and an alcohol identical to the cyclic alcohol which is prepared, the alcohol to acid mole ratio in said boric acid ester being lower than 3:1.

2. The process of claim 1 wherein said ester is composed of three alcohol molecules and four boric acid molecules.

3. The process of claim 1 wherein the ester is the ester of cyclohexanol and the alcohol produced is cyclohexanol.

References Cited

UNITED STATES PATENTS

| 2,721,180 | 10/1955 | Lawrence et al. | |
|---|---|---|---|
| 3,061,626 | 10/1962 | Pearson et al. | 260—631 X |
| 3,109,864 | 11/1963 | Fox et al. | 260—617 X |
| 3,232,704 | 2/1966 | Helbig et al. | 260—617 |
| 3,238,238 | 3/1966 | McNamara et al. | 260—617 |
| 3,243,449 | 3/1966 | Winnick | 260—617 |

FOREIGN PATENTS 1,166,679  11/1958  France.

OTHER REFERENCES

Freidin, Soviet Research in Boron Chemistry (1949–1956) pp. 77–9 (1961).

O'Connor et al., J. Am. Chem. Soc., vol. 77, pp. 1578–81 (1955).

LEON ZITVER, *Primary Examiner.*

L. WEINBERGER, *Examiner.*

T. G. DILLAHUNTY, *Assistant Examiner.*